Patented Feb. 21, 1950

2,497,905

UNITED STATES PATENT OFFICE 2,497,905

COATING ZINC OR CADMIUM TO IMPART CORROSION AND ABRASION RESISTANCE

Charles W. Ostrander, Baltimore, Md., assignor, by mesne assignments, to Rheem Manufacturing Company, San Francisco, Calif., a corporation of California No Drawing. Application March 3, 1945, Serial No. 580,929

9 Claims. (Cl. 148—6.16)

The present invention relates to the treatment of zinc, cadmium, alloys thereof, and galvanized metal to impart thereto improved corrosion and abrasion resistance.

Heretofore, solutions containing chromic acid or salts thereof, and a mineral acid or salt thereof, specifically hydrochloric, nitric and sulfuric acids or their salts have been used as dips for imparting corrosion resistance to metals of this character. However, in many cases the corrosion resistance of the coatings so produced is not commercially satisfactory, and moreover such coatings frequently lack required abrasion resistance.

I have found that if such a coating solution contains a mixture of nitric and sulfuric acids together with phosphoric acid, or salts of these mineral acids, an improved visible corrosion resistant coating is obtained to which enhanced abrasion resistance is imparted by a simple heat treatment. I attribute these new results to the presence of phosphoric acid or a salt thereof in the mixture.

Preferably, the coating solution consists of chromic acid or a soluble salt thereof, together with a mixture of hydrochloric, sulfuric, nitric and phosphoric acids or soluble salts thereof. Such a solution imparts a desirable green coating indicative of the enhanced corrosion resistance. The hydrochloric acid may be eliminated without affecting the physical characteristics of the coating but it is preferred because it increases the covering power of the solution.

The coatings obtained by the present invention, in addition to being corrosion and abrasion resistant, also form excellent paint bases and may be dyed with conventional organic dyes.

In carrying out the invention, articles having a coating of zinc, cadmium, and alloys thereof, or castings of these metals, as well as galvanized iron, have their surfaces suitably cleaned, where necessary, and are then subjected to one of the solution mixtures illustrated below, preferably by immersion or dipping therein:

Example I

| | |
|---|---|
| $CrO_3$ | gms./liter __ 30 |
| $H_3PO_4$ | cc./liter __ 10 |
| HCl | do ____ 5 |
| $H_2SO_4$ | do ____ 5 |
| $HNO_3$ | do ____ 5 |

An opaque dark green coating is obtained which is preferred.

Example II

| | |
|---|---|
| $Na_2Cr_2O_7$ | gms./liter __ 50 |
| $H_3PO_4$ | cc./liter __ 5 |
| $HNO_3$ | do ____ 5 |
| $H_2SO_4$ | do ____ 5 |
| HCl | do ____ 5 |

A substantially similar coating is formed as in Example I.

The foregoing solutions are acidic, generally being initially at about pH 0.6 and the effective pH of the solution varies within about 0.5 to 2.0. The articles are dipped or immersed in the baths until the desired coating is obtained, usually for about 15 seconds to 2 minutes. The temperature of the bath is maintained between about 50° F. to 180° F. Satisfactory results are obtained with a bath at about room temperature, e. g. 60° to 90° F. and having a pH within the above limits, and with an immersion time of about 45 seconds to 1 minute.

Upon removal from the bath, the articles are suitably rinsed in tap water, and then preferably dried in any appropriate manner, e. g. as by an air blast.

The coating produced has improved corrosion resistance, and in order to impart improved abrasion resistance, the coated articles preferably after being dried are heated in an electric or gas oven or by means of a suitable flame up to a temperature of from about 150° F. to 250° F. or higher. Enhanced abrasion resistance is observed as soon as the temperature of the coating is elevated and improves with increase in temperature or duration of heat treatment or both.

As stated above, the action of the phosphoric acid in the solution mixture produces a coating having the improved abrasion resistance upon being subjected to the simple heat treatment described.

The pH range, the time of immersion or contact of the solution with the metal surface and the temperature of the solution above recited are preferred conditions. Also, the proportion of the constituents of the baths must be maintained within preferred limits. Thus, the chromic acid is used in amount between about 20 g./l. and 40 g./l. Where the dichromate is used, a range of between about 20 g./l. and 60 g./l. is employed, i. e., to produce an equivalent amount of $CrO_3$ anions as described, and this range is used where soluble salts of chromic acid are employed, notably sodium and potassium dichromates In the case of the phosphoric acid the range is between about 1 and 15 cc./l. The amounts of each of the other mineral acids should be substantially equal, and the total amount should produce a solution having an initial pH within about 0.5 to 2.0 as above mentioned.

When the hydrochloric acid is eliminated, the range of proportions is not modified and a similar green coating is obtained.

Where soluble salts of the mineral acids described, e. g. phosphoric acid, nitric acid, hydrochloric acid and sulfuric acid are employed, e. g. of sodium, potassium, zinc and ammonium salts of these acids, the amounts of such salts added to the solution mixture are increased to provide the solution with quantities of the anions of the acids substantially equal to the quantities obtained when the corresponding acids are employed. Mixtures of the acids and salts described can be employed provided the critical proportions set forth are substantially maintained. The formulas for the baths in Examples I and II, above, describe in general the preferred proportions of constituents, it being noted that Example I includes chromic acid and Example II dichromate.

I claim:

1. The process of forming a visible corrosion resistant coating on a surface of zinc or cadmium or alloys consisting essentially thereof which comprises subjecting the same to an aqueous acidic solution having a pH between about 0.5 to 2.0 consisting essentially of a compound selected from the group consisting of chromic acid and soluble salts thereof; a compound selected from the group consisting of phosphoric acid and soluble salts thereof; a compound selected from the group consisting of nitric acid and soluble salts thereof and a compound selected from the group consisting of sulfuric acid and soluble salts thereof until a green coating is formed, the chromate ions being present in amount of between about 20 g./l. and 40 g./l. of chromic acid, the phosphoric ions being present in amount of between about 1 and 15 cc./l. of phorphoric acid and the remaining mineral acids being in amounts by volume to produce a pH within about 0.5 to 2.0.

2. A process in accordance with claim 1 wherein the solution also contains a compound selected from the group consisting of hydrochloric acid and salts thereof.

3. A process in accordance with claim 1 wherein the solution is in contact with a metal surface for about 15 seconds to two minutes and has a temperature between 50° and 180° F.

4. The process of forming a visible corrosion resistant coating on a surface of zinc or cadmium or alloys consisting essentially thereof which comprises subjecting the same to an aqueous acidic solution having a pH between about 0.5 to 2.0 consisting essentially of a compound selected from the group consisting of chromic acid and soluble salts thereof; a compound selected from the group consisting of phosphoric acid and soluble salts thereof; a compound selected from the group consisting of nitric acid and soluble salts thereof and a compound selected from the group consisting of sulfuric acid and soluble salts thereof until a green coating is formed, the chromate ions being present in amount of between about 20 g./l. and 40 g./l. of chromic acid, the phosphoric ions being present in amount of between about 1 and 15 cc./l. of phosphoric acid and the remaining mineral acids being in amounts by volume to produce a pH within about 0.5 to 2.0, and after said treatment heating the coating to increase its abrasion resistance.

5. A process in accordance with claim 1 wherein the solution also contains a compound selected from the group consisting of hydrochloric acid and salts thereof, and wherein after the said treatment the coating is heated up to a temperature of from about 150 to 250° F. to increase its abrasion resistance.

6. A solution for imparting corrosion and abrasion resistance to zinc or cadmium or alloys thereof consisting essentially of an aqueous acidic solution having a pH between about 0.5 to 2.0 consisting essentially of a compound selected from the group consisting of chromic acid and soluble salts thereof; a compound selected from the group consisting of phosphoric acid and soluble salts thereof; a compound selected from the group consisting of nitric acid and soluble salts thereof and a compound selected from the group consisting of sulfuric acid and soluble salts thereof, the chromate ions being present in amount of between about 20 g./l. and 40 g./l. of chromic acid, the phosphoric ions being present in amount of between about 1 and 15 cc./l. of phosphoric acid and the remaining mineral acids being in amounts by volume to produce a pH within about 0.5 to 2.0.

7. A process in accordance with claim 1 wherein the solution also contains a compound selected from the group consisting of hydrochloric acid and salts thereof and wherein the solution is in contact with a metal surface for about fifteen seconds to two minutes and has a temperature between 50° and 180° F.

8. A process in accordance with claim 1 wherein after the said treatment the coating is heated up to a temperature of from about 150° to 250° F. to increase its abrasion resistance.

9. A solution in accordance with claim 6 containing a compound selected from the group consisting of hydrochloric acid and salts thereof.

CHARLES W. OSTRANDER.

REFERENCES CITED

The following references are of record in the file of this patent:

UNITED STATES PATENTS

| Number | Name | Date |
| --- | --- | --- |
| 2,030,601 | McDonald | Feb. 11, 1936 |
| 2,276,353 | Thompson | Mar. 17, 1942 |
| 2,288,007 | Lum | June 30, 1942 |
| 2,296,884 | Thompson | Sept. 29, 1942 |
| 2,348,698 | Thompson | May 9, 1944 |
| 2,393,665 | Taylor | Jan. 29, 1946 |
| 2,418,608 | Thompson et al. | Apr. 8, 1947 |

FOREIGN PATENTS

| Number | Country | Date |
| --- | --- | --- |
| 483,551 | Great Britain | Apr. 14, 1938 |